United States Patent
Taniguchi

(10) Patent No.: US 6,522,892 B1
(45) Date of Patent: Feb. 18, 2003

(54) METHOD OF CONTROLLING TRANSMISSION OUTPUT OF RADIO VIA CLOSED LOOP AND OPEN LOOP OPERATION

(75) Inventor: Toshio Taniguchi, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/040,596

(22) Filed: Mar. 18, 1998

(30) Foreign Application Priority Data

Oct. 31, 1996 (JP) .............................................. 8-290390

(51) Int. Cl.⁷ ................................................ H04B 1/40
(52) U.S. Cl. ........................................ 455/522; 455/126
(58) Field of Search .......................... 455/92, 115, 116, 455/422, 423, 574, 522, 126, 127, 69

(56) References Cited

U.S. PATENT DOCUMENTS

| | | | |
|---|---|---|---|
| 5,128,629 A | | 7/1992 | Trinh ........................... 330/129 |
| 5,175,875 A | * | 12/1992 | Yokoya ......................... 455/89 |
| 5,199,110 A | * | 3/1993 | Adachi ........................ 455/126 |
| 5,241,690 A | | 8/1993 | Larsen et al. |
| 5,305,468 A | * | 4/1994 | Bruckert ....................... 455/69 |
| 5,333,175 A | * | 7/1994 | Ariyavisitakul .............. 379/58 |
| 5,386,588 A | * | 1/1995 | Yasuda ....................... 455/33.1 |
| 5,430,760 A | * | 7/1995 | Dent ........................... 375/200 |
| 5,487,180 A | * | 1/1996 | Ohtake ....................... 455/54.1 |
| 5,507,018 A | | 4/1996 | Seppalä ....................... 455/127 |
| 5,559,471 A | * | 9/1996 | Black ........................... 330/277 |
| 5,590,408 A | * | 12/1996 | Weiland ....................... 455/69 |
| 5,604,924 A | * | 2/1997 | Yokoya ........................ 455/68 |
| 5,606,285 A | * | 2/1997 | Wang ........................... 330/134 |
| 5,623,484 A | * | 4/1997 | Muszynski ................... 370/335 |
| 5,710,981 A | * | 1/1998 | Kim ............................ 455/69 |
| 5,752,171 A | * | 5/1998 | Akiya ........................ 455/126 |
| 5,815,798 A | * | 9/1998 | Bhagalia .................... 455/13.4 |

FOREIGN PATENT DOCUMENTS

| | | |
|---|---|---|
| EP | 0616435 | 9/1994 |

\* cited by examiner

*Primary Examiner*—Thanh Cong Le
*Assistant Examiner*—Nick Corsaro
(74) *Attorney, Agent, or Firm*—Hogan & Hartson, LLP

(57) ABSTRACT

In a radio, a signal is transmitted through a control channel or a call channel by use of one transmitting circuit, and the transmission output of the call channel is intentionally changed. At the time of transmission of a signal through the control channel, a closed loop is formed in order to feed back a detection output value of the transmission output of the control channel to a transmission output control section, thereby controlling the transmission output of the control channel. In contrast, at the time of transmission of a signal through the call channel, the closed loop is canceled, thereby controlling the transmission output of the call channel.

4 Claims, 1 Drawing Sheet

METHOD OF CONTROLLING TRANSMISSION OUTPUT OF RADIO VIA CLOSED LOOP AND OPEN LOOP OPERATION

BACKGROUND OF THE INVENTION

The present invention relates to the control of a transmission output of a radio.

For a radio which must stably hold transmission output power, it is very important to stably maintain the gain of a transmitting circuit at all times.

To realize such a radio, various types of transmission output control have already been carried out. The transmission output control can be broadly classified into an open loop type, in which the gain of a transmitting circuit is stabilized by means of an output from a temperature sensor or a temperature-detecting element, such as a thermistor; and a closed loop type, in which the gain of the transmitting circuit is stabilized through use of an output from a detection circuit provided in the final stage of the transmitting circuit.

The transmission output control of the former type has the advantage of comparative simplicity and less expense, as well as of being able to intentionally and readily change the transmission output. On the other hand, the individual difference in the temperature characteristics of the components constituting the temperature-detecting element and the transmitting circuit makes it impossible to ensure sufficient accuracy of gain. The transmission output control of the latter type requires a detection circuit which is provided in the final stage of the transmitting circuit and is the only element that may adversely affect the accuracy of gain. For this reason, the transmission output control of the closed loop type-provides the accuracy of gain better than that provided by the transmission output control of the open loop type. On the other hand, the extent of variation in the transmission output power is determined by the extent of detection of the detection circuit. Therefore, the transmitting circuit, which intentionally changes the transmission output power, will become very complicated in configuration and expensive.

In the case of the foregoing existing technique being applied to a radio which transmits a signal through a control channel or a call channel by use of one transmitting circuit, and which intentionally changes the transmission output of the call channel while constantly maintaining the transmission output of the control channel, e.g., a base station for use with a simplified portable telephone which employs a time-division multiplexing method, a sufficient accuracy of transmission output cannot be achieved by the open loop method. The closed loop method suffers the problem of limiting the extent of change in the transmission output or involves the monitoring of a detection value output from the detection circuit for each transmission.

SUMMARY OF THE INVENTION

To solve the foregoing problems, the present invention provides a radio which transmits a signal through a control channel or a call channel by use of one transmitting circuit and which intentionally changes the transmission output of the call channel, the improvement being characterized by comprising: a closed loop which is formed, at the time of transmission of a signal through the control channel, in order to feed back a detection output value of the transmission output of the control channel to a transmission output control section to thereby control the transmission output of the control channel, and which is canceled at the time of transmission of a signal through the call channel, thereby controlling the transmission output of the call channel.

DETAILED DESCRIPTION OF THE PREFERRED EMBODIMENT

Figure 1:
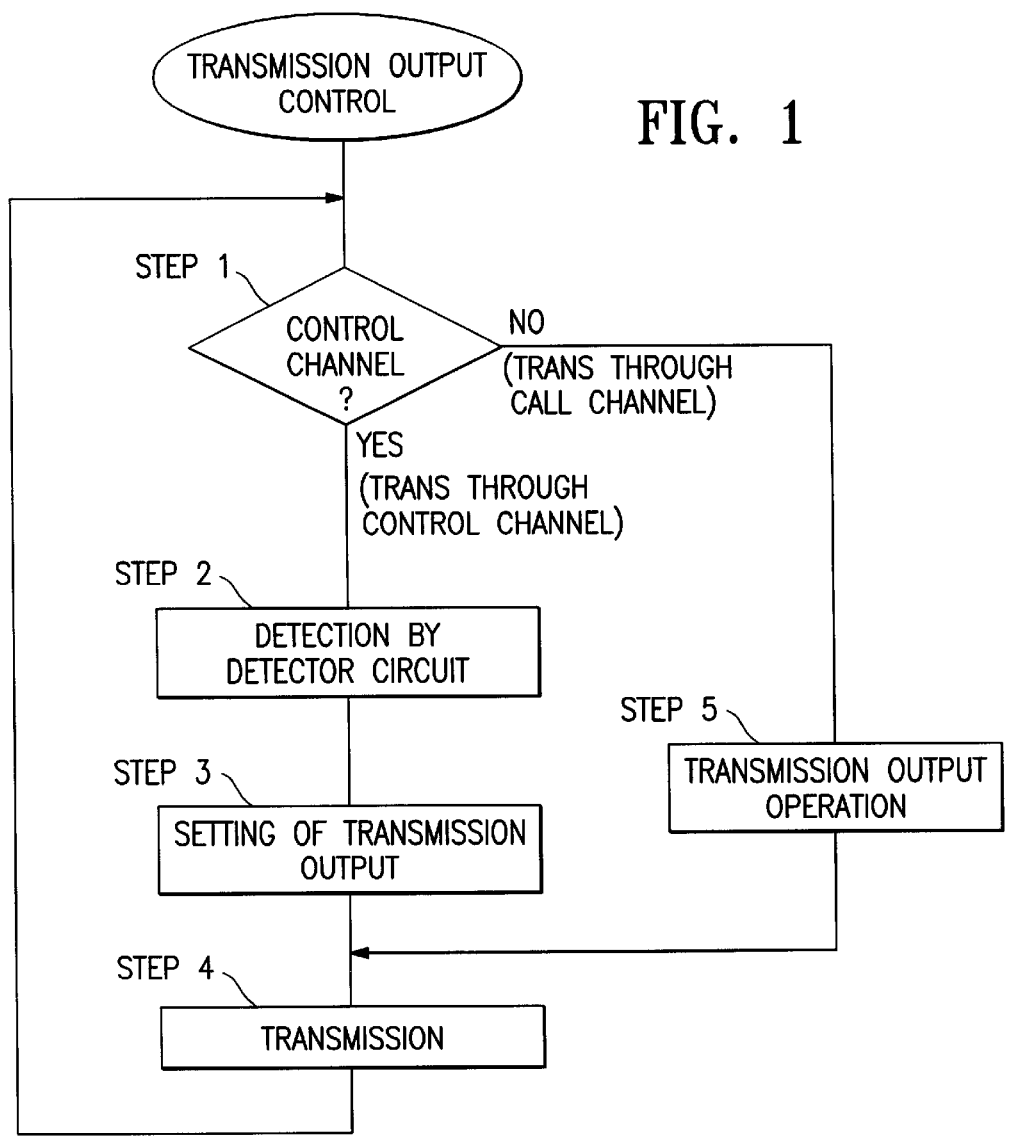
FIG. 1 is a flowchart showing a method of controlling the transmission output of a radio according to the present invention.
Figure 2:
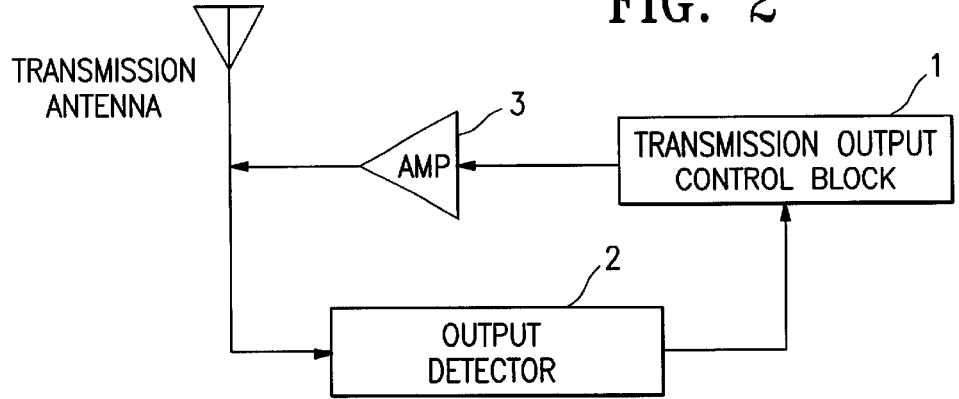
FIG. 2 is a block diagram showing a transmission block of a radio according to one embodiment of the present invention, in which a closed loop is formed at the time of transmission of a signal through a control channel.

FIG. 1 shows a flowchart showing a method of controlling the transmission output of a radio according to the present invention, and FIG. 2 is a block diagram showing a transmission block diagram with a closed loop. Since a control channel and a call channel are available for signal transmission, the way to control a transmission output will change depending on which one of the two channels is used for transmission. More specifically, in step 1, the transmission output control block 1, shown in FIG. 2, makes a determination as to whether or not a signal is transmitted through the control channel. In the case of signal transmission performed through the control channel, the processing proceeds to step 2, where an output from an output detector 2 is detected. Subsequently, in step 3, a transmission output is set so as to constantly control the transmission output on the basis of the value of the thus-detected output. In step 4, transmission is performed on the basis of the foregoing setting. In a case where a signal is transmitted through the call channel in step 1, the closed loop operations executed in steps 2 and 3 are not performed (i.e., the loop is canceled). The processing then proceeds to step 5, where a transmission output operation is performed, and the transmission of a signal is performed in step 4. The value detected in step 2 has been stored in memory of the transmission output control block 1. In the case of signal transmission performed through the call channel, a transmission output is set on the basis of the detection output value stored in the memory in step 5 (i.e., a step of a transmission output operation). Accordingly, at the time of transmission of a signal through the call channel, a transmission output is controlled through use of only the transmission signal output from a variable attenuator or a modulator provided in the transmission output control block 1.

As mentioned previously, the signal transmission performed through the control channel corresponds to a predetermined transmission output. Consequently, the detection output value obtained by the output detector 2 shown in FIG. 2 is monitored by the transmission output control block 1, and the signal is transmitted according to the transmission output settings. As a result, the gain of the transmission output is stabilized, and the accuracy of the same is maintained. The detection output value delivered from the output detector 2 shown in FIG. 2 is monitored solely at the time of transmission of a signal through the control channel.

The signal transmission performed through the call channel corresponds to a variable transmission output. The value, which has been output from the output detector 2 shown in FIG. 2 and monitored at the time of transmission of a signal through the control channel, is stored in the transmission output control block 1. Accordingly, signal transmission is performed by processing a transmission output through calculation of intended transmission output power and an output value of the power, thereby resulting in a gain being stabilized and the accuracy of the transmission output being maintained.

As has been described above, in the case of the control channel, in which signal transmission is performed through use of a constant transmission output, a closed loop control operation is carried out. In contrast, in the case of the call channel, in which signal transmission is performed through use of a variable transmission output, a transmission control operation is performed through use of only the signal output from an attenuator or a modulator provided in a transmitting circuit, enabling holding of a constantly stable transmission output.

The present invention has the following advantages.

It can be reduced a number of monitors for correction value regarding the accuracy of a transmission output;

A transmission output detection circuit can be simplified;

The accuracy of a transmission output can be stable;

The interference resulting from the control of a transmission output can be prevented;

A frequency band of the transmission can be effectively utilized by virtue of the control of a transmission output.

What is claimed is:

1. A method of controlling, during establishment of a call, the transmission output of a radio which transmits a signal through one of a control channel and a call channel by use of one transmitting circuit within the radio, and which intentionally changes the transmission output of the call channel, comprising:

determining whether the signal is transmitted through the control channel or the call channel;

during transmission of a signal through the control channel, controlling the transmission output of the control channel by forming a closed loop to feed back a detection output value of the transmission output of the control channel from the one transmitting circuit to a transmission output control section of the radio; and during transmission of a signal through the call channel, canceling the closed loop and controlling the transmission output of the call channel based on control parameters established using the closed loop during signal transmission through the control channel.

2. The method of controlling the transmission output of a radio as claimed in claim 1, wherein the transmission output control section holds a detection output value of the transmission output which is obtained by the closed loop formed at the time of transmission of a signal through the control channel, as well as controlling the transmission output on the basis of the thus-held detection output value at the time of transmission of a signal through the call channel.

3. A method of controlling a transmission output of a radio which transmits a signal through a control channel or a call channel by use of one transmitting circuit within the radio, which circuit holds constant a transmission output of the control channel, and which intentionally changes a transmission output of the call channel, said method comprising the steps of:

determining whether the signal is transmitted through the control channel or the call channel;

at a time of transmission of a signal through the control channel, forming a closed loop by feeding back a detection output value of the transmission output of the control channel from the one transmitting circuit to a transmission output control section, thereby holding constant the transmission output of the control channel; and at a time of transmission of a signal through the call channel, forming an open loop by canceling the closed loop and controlling the transmission output of the call channel based on control parameters established using the closed loop during signal transmission through the control channel, thereby intentionally changing the transmission output of the call channel.

4. The method as claimed in claim 3, wherein the transmission output control section holds the detection output value of the transmission output obtained from the closed loop, as well as controlling the transmission output on the basis of the thus-held detection output at the time of transmission of a signal through the call channel.

* * * * *